US006990838B2

(12) United States Patent
Witchey

(10) Patent No.: US 6,990,838 B2
(45) Date of Patent: Jan. 31, 2006

(54) SKID STEER ATTACHMENT LOCK

(76) Inventor: Bryan Witchey, 209 Fairway Cir., Cross Junction, VA (US) 22625

(*) Notice: Subject to any disclaimer, the term of this patent is extended or adjusted under 35 U.S.C. 154(b) by 0 days.

(21) Appl. No.: 10/384,546

(22) Filed: Mar. 11, 2003

(65) Prior Publication Data

US 2003/0167805 A1 Sep. 11, 2003

Related U.S. Application Data

(60) Provisional application No. 60/363,275, filed on Mar. 11, 2002.

(51) Int. Cl.
*B60R 25/00* (2006.01)

(52) U.S. Cl. .................. 70/14; 37/231; 70/19; 70/199; 70/211; 70/238; 172/272; 172/683

(58) Field of Classification Search .................. 70/19, 70/94, 238, 14, 18, 209, 226, 199, 200, 202, 70/203, 211, 212; 37/231; 172/272, 683, 172/817; 292/259 R, 288, 289, 292; 403/377–379
See application file for complete search history.

(56) References Cited

U.S. PATENT DOCUMENTS

| | | | | |
|---|---|---|---|---|
| 3,598,462 A | | 8/1971 | Kanitz | 312/219 |
| 3,834,780 A | | 9/1974 | McCelellan et al. | 312/219 |
| 4,262,503 A | * | 4/1981 | Kuebler | 70/101 |
| 4,288,944 A | | 9/1981 | Donovan | 49/395 |
| 4,295,673 A | | 10/1981 | Miller | 292/21 |
| 4,432,432 A | * | 2/1984 | Martin | 180/287 |
| 4,666,106 A | | 5/1987 | Kohout | 244/129.3 |
| 4,825,671 A | * | 5/1989 | Wu | 70/238 |
| 4,835,999 A | * | 6/1989 | Chant | 70/238 |
| 4,972,693 A | * | 11/1990 | Inouye | 70/238 |
| 5,022,697 A | * | 6/1991 | Hettwer | 70/238 X |
| 5,038,667 A | * | 8/1991 | Slater | 70/199 |
| 5,082,213 A | * | 1/1992 | Torres | 244/224 |
| 5,101,647 A | * | 4/1992 | Johnston | 70/199 |
| 5,131,245 A | | 7/1992 | Chen | 70/209 |
| 5,439,210 A | * | 8/1995 | Davis | 473/485 |
| 5,582,401 A | | 12/1996 | Malone et al. | 273/1.5 R |
| 5,644,937 A | * | 7/1997 | Farino | 70/261 |
| 5,890,382 A | | 4/1999 | Wang | 70/209 |
| 5,927,107 A | | 7/1999 | Mitchell | 70/14 |
| 6,173,590 B1 | * | 1/2001 | Witchey | 70/14 |
| 6,519,983 B2 | * | 2/2003 | Witchey | 70/209 |
| 6,553,797 B2 | * | 4/2003 | Witchey | 70/209 |
| 6,834,896 B2 | * | 12/2004 | Smith | 292/259 R |
| 2002/0104342 A1 | * | 8/2002 | Witchey | 70/209 |

* cited by examiner

*Primary Examiner*—Lloyd A. Gall
(74) *Attorney, Agent, or Firm*—Richard C. Litman

(57) ABSTRACT

A skid steer attachment lock for preventing the theft of a tool attached to a skid steer loader. The device comprises of an extendable hollow shaft having a first and second opposite ends, wherein the first and second opposite ends are open and adapted to respectively accommodate a first and second attachment tool locking arms when the arms are facing each other; and a locking mechanism disposed in the outer shaft of the extendable shaft for temporarily locking the extendable shaft at a desired length.

10 Claims, 5 Drawing Sheets

SKID STEER ATTACHMENT LOCK

CROSS-REFERENCE TO RELATED APPLICATION

This application claims the benefit of U.S. Provisional Patent Application Ser. No. 60/363,275, filed Mar. 11, 2002.

BACKGROUND OF THE INVENTION

1. Field of the Invention

The present invention relates generally to anti-theft devices for vehicles. More specifically, the invention is an anti-theft device for a skid steer loader attachment tool to prevent unauthorized removal of the attachment tool from a skid steer loader.

2. Description of the Related Art

The related art of interest describes various locking devices, but none discloses the present invention. There is a need for a locking device for skid steer loader attachment tools including, but not limited to, skid steer loader general purpose buckets, dirt buckets, utility buckets, light material buckets, multi purpose buckets, pallet forks, and landscape tillers and rakes.

An attachment tool attached to a skid steer loader is vulnerable to misuse and theft, particularly at night when skid steer loaders are often left unattended on a building site. A skid steer loader attachment is typically coupled to a skid steer loader by means of a mechanical coupler comprising two securing arms. Rotating the securing arms through about 90° from a horizontal attached position to a vertical release position on either side of the coupler releases the attached tool from the skid steer loader. Thus, an opportunistic thief merely has to move a lever to an up position in order to release a tool attached to a skid steer loader and, for example, illegally haul the released attachment tool away on a truck.

Several efforts have been made to address these problems. U.S. Pat. No. 4,666,106 issued May 19, 1987 to J. M. Kohout describes a device for securing an opposing pair of outwardly opening cabin doors on general aviation aircraft and the like. Specifically, a pair of non-extensible elongated elements, such as a pair of rods or a rod and cable, are joined together at one end such that the elements can rotate independently. The '106 patent does not teach or suggest a device to secure a tool attached to a skid steer loader.

U.S. Pat. Nos. 3,598,462 and 4,288,944 respectively describe a locking mechanism for securing a filing cabinet, and a security door. U.S. Pat. Nos. 5,131,245 and 5,582,401 respectively describe an automobile steering lock, and a basketball hoop closure. The '462, '944, '245, and '401 patents do not teach or suggest a device to secure a tool attached to a skid steer loader.

U.S. Pat. Nos. 3,834,780, 4,295,673, 5,890,382, and 5,927,107 respectively describe a filing cabinet locking mechanism, an exit device, a multi-shaft combination lock, and a container locking device. The '780, '673, '382, and '107 patents do not teach or suggest a device to secure a skid steer tool attached to a skid steer loader.

None of the above inventions and patents, taken either singularly or in combination, is seen to describe the instant invention as claimed. Thus, a skid steer attachment lock solving the aforementioned problems is desired.

SUMMARY OF THE INVENTION

The present invention is a skid steer attachment lock adapted to prevent an unauthorized removal of a tool attached to a skid steer loader. The skid steer attachment lock comprises: an extendable hollow shaft having a first and second opposite ends, wherein the first and second opposite ends are open and able to respectively accommodate a first and second attachment locking arms when the arms are facing each other; and a locking mechanism disposed in the outer shaft for temporarily locking the extendable shaft at a desired length.

Accordingly, it is a principal object of the invention to provide a skid steer attachment lock for a skid steer loader.

It is another object of the invention to provide a skid steer attachment lock which attaches to the tool securing arms of a skid steer loader.

It is a further object of the invention to provide a skid steer attachment lock which prevents illicit removal of a skid steer loader tool from a skid steer loader.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to an attachment lock to help prevent theft of a skid steer attachment tool. More specifically, the invention prevents a skid steer attachment tool from being inappropriately detached from a skid steer loader.

Figure 1:
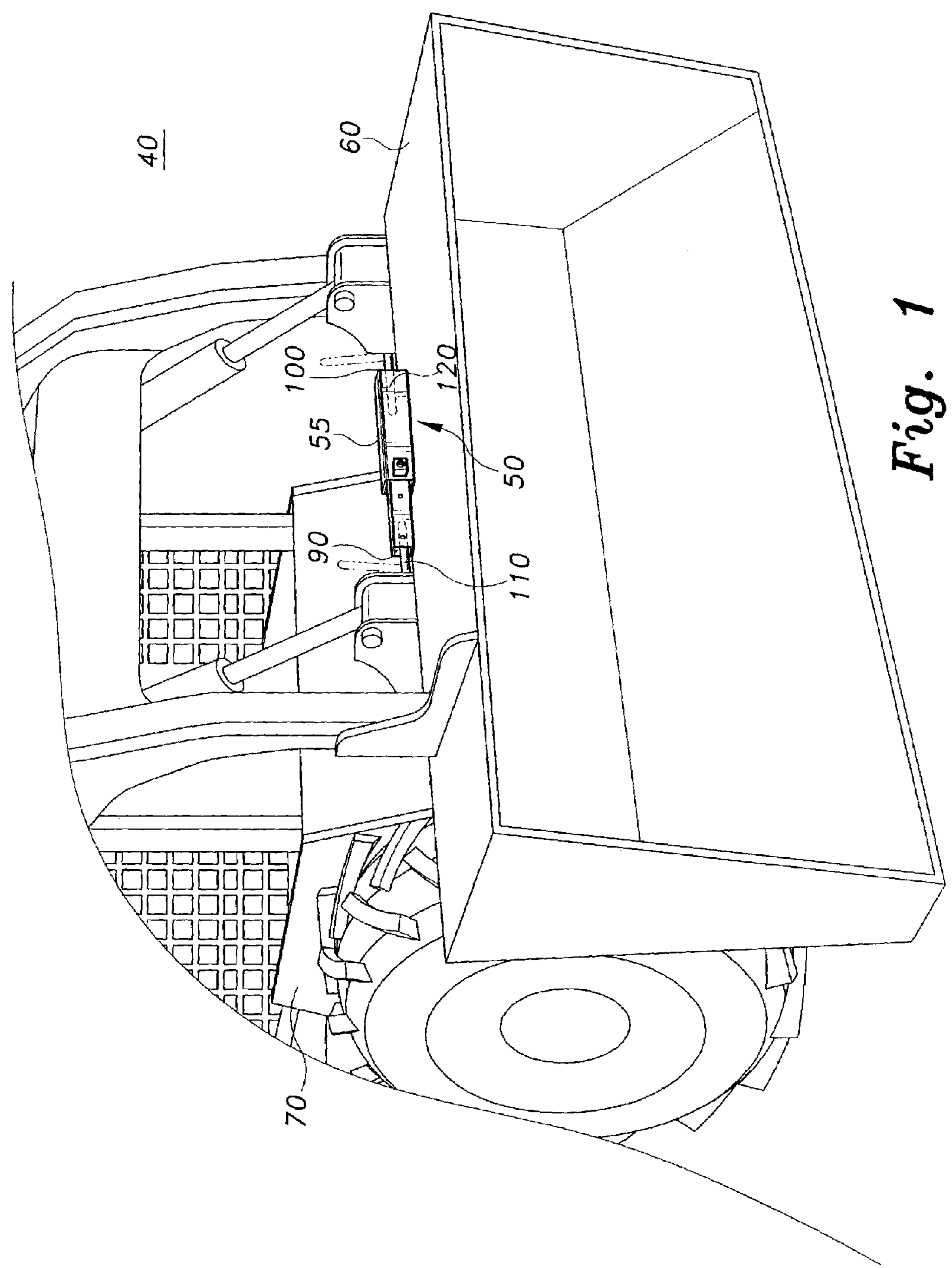
FIG. 1 is a perspective environmental view of an attachment lock according to the invention.

FIG. 1 is a perspective environmental view 40 of an attachment lock 50 according to the invention. The attachment lock 50 comprises an extendable shaft 55 adapted to prevent the illegal removal of a skid steer attachment tool 60 from a skid steer loader 70. The extendable shaft 55 has a first and second opposite ends 90 and 100 that are open and able to respectively accommodate a first 110 and second 120 attachment tool locking arms when the arms 110 and 120 are in a down tool lock position and facing each other as shown in FIG. 1 (the up unlocked position for both arms 110 and 120 is shown in phantom).

Figure 2A:
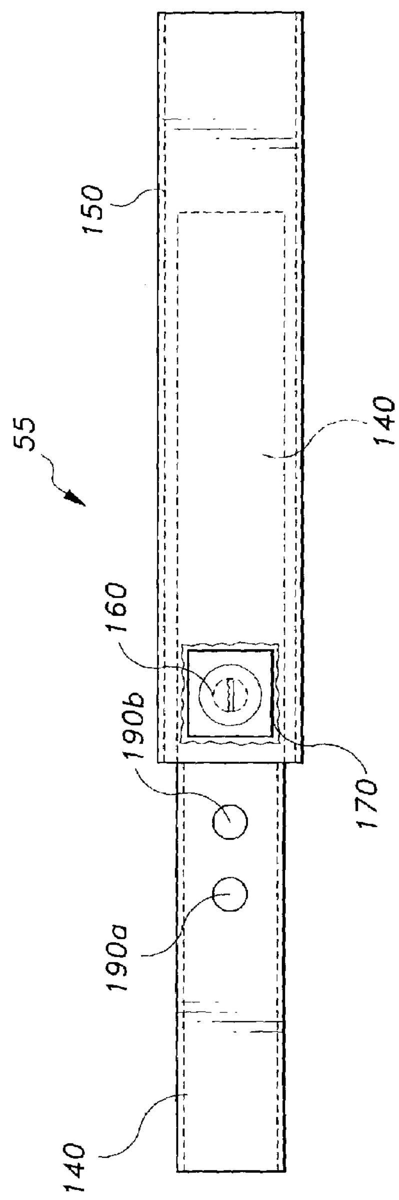
FIG. 2A is a top view of the skid steer attachment lock according to the present invention.
Figure 2B:
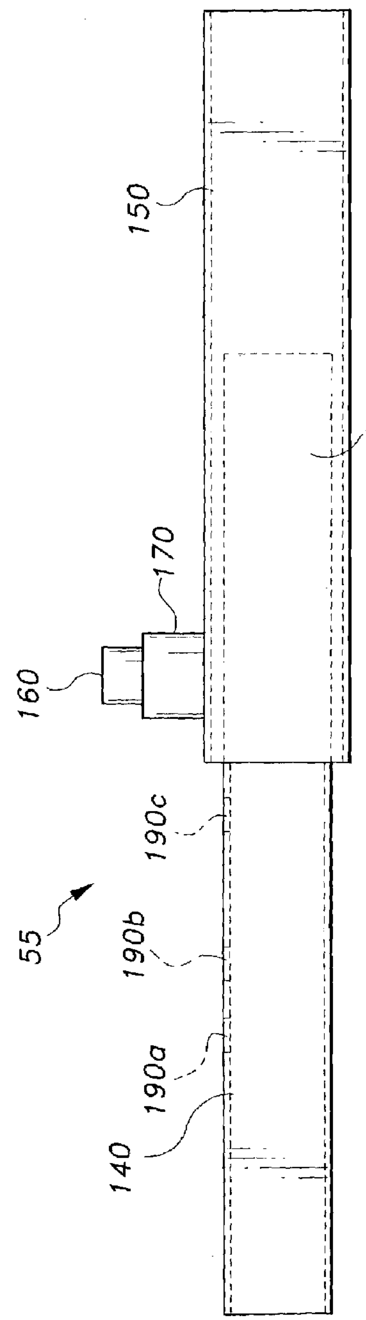
FIG. 2B is a side view of the skid steer attachment lock of FIG. 2A according to the present invention.

Referring to FIGS. 2A and 2B, the extendable hollow shaft 55 comprises a locking mechanism 160 for temporarily locking the extendable shaft 55 at a desired length. The extendable shaft 55 also comprises an inner 140 and outer 150 shaft segments. The shaft 55 extends by either telescoping one shaft segment 140 inside the other 150 segment or by parallel sliding of one segment past the other. The inner 140 and outer 150 segments are preferably made of steel, but any material that is sufficiently durable may be used.

The locking mechanism 160 is disposed in the outer shaft segment 150 for temporarily locking the extendable shaft 55 at a desired length. The exact location of the locking mechanism 160 is not critical, but it is preferred that the locking mechanism 160 is approximately disposed about midway between the first 90 and second 100 opposite ends of the extendable shaft 55 when the extendable shaft 55 is extended to about its maximum length. The locking mechanism 160 is preferably a spring twist lock housed in a housing 170. This type of lock is well known in the art. However, it should be understood that the type of locking mechanism used in the invention is not critical and any suitable locking mechanism may be used.

Figure 3:
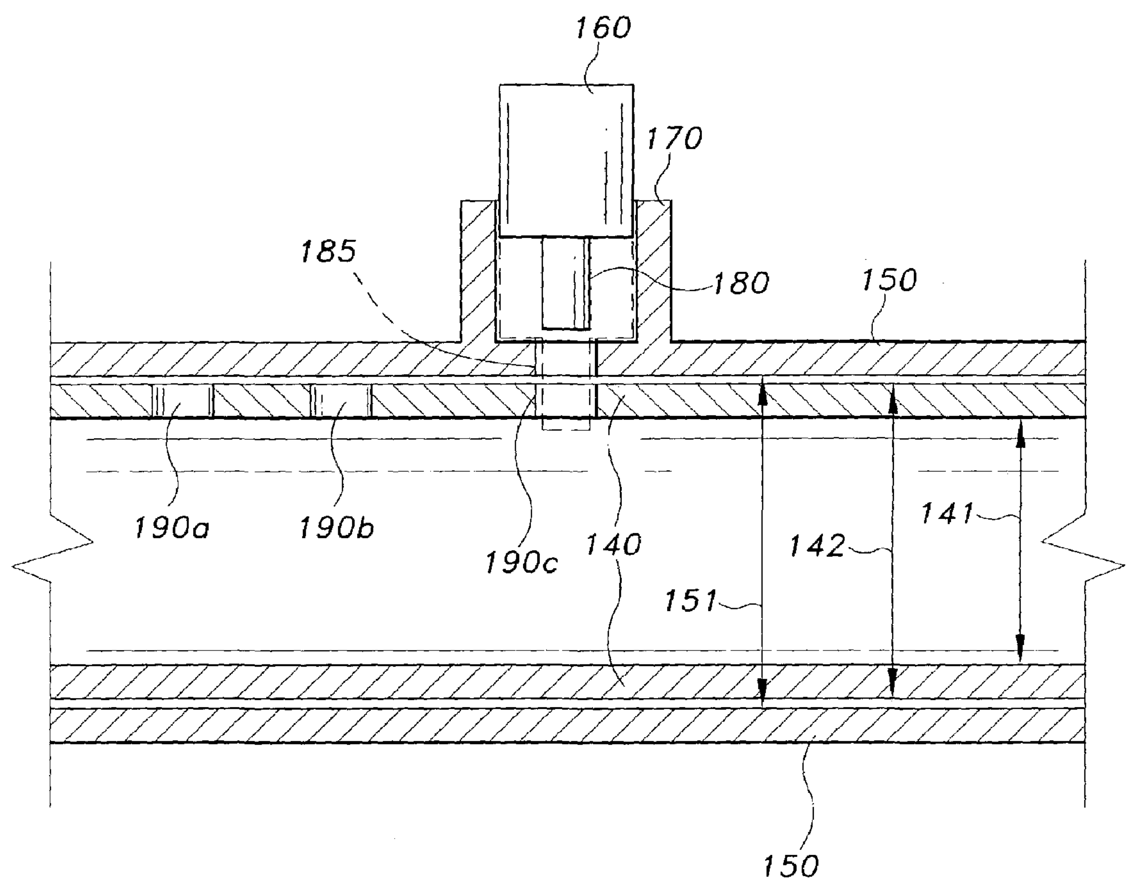
FIG. 3 is a longitudinal section view showing a spring loaded lock disposed in the skid steer attachment lock according to the invention.

FIG. 3 shows a sectional view of the shaft segments 140, 150, in the vicinity of the locking mechanism 160. The locking mechanism 160 has a lock pin 180 on one end. Surrounding and protecting the locking mechanism 160 is a rectangular housing 170; however, the housing 170 may take any suitable form or even form an integral part of the locking mechanism 160. The locking mechanism 160 is shown in its unlocked position in solid lines. The locking mechanism 160 may be moved to a locked position, shown in phantom, in which the lock pin 180 is inserted through an outer hole 185 and one of the inner holes (190*a,* 190*b,* or 190*c*) in inner segment 140.

For example, a skid steer loader operator could move the inner segment 140 until the inner hole 190*c* is aligned with the outer hole 185 and upon alignment press the lock mechanism 160 thereby moving the lock pin 180 (shown in phantom) into the aligned holes 185 and 190*c* and causing the lock mechanism 160 to lock. Once the lock-mechanism 160 is locked a key (not shown) must be inserted to move the locking mechanism 160 to the unlocked position (shown as a solid line), thereby retracting the lock pin 180 from the aligned holes 185 and 190*c*. The shaft segment 140 has a plurality of holes 190*a,* 190*b,* 190*c* defined therein in order to adjust the length of extendable shaft 55 as desired. It should be understood that the number of holes defined in the inner shaft 140, and their distance apart, may vary; in addition, the holes may be present on more than one side of the inner segment 140.

When the skid steer attachment lock 50 is used, it is positioned between the skid steer securing arms 110 and 120 of a steer loader 70 attached to an attachment tool 60. The arms 110 and 120 should be approximately facing each other (see FIG. 1). The attachment lock 50 is shortened by telescoping the inner segment 140 into the outer segment 150 and sliding one of the first 90 or second 100 opposite open ends over a securing arm 110 or 120. The attachment lock 50 is then extended and the same process repeated with respect to the other opposite end 90 or 100 and the remaining securing arm 110 or 120. The inner 140 or outer 150 segments are moved until alignment between the outer hole 185 and one of the inner holes (e.g. 190*c*) align. The lock mechanism 160 is pressed to lock the locking pin 180 in the aligned holes. In this manner the likelihood of theft of the attachment tool 60 is greatly reduced because an opportunistic thief (or mischievous person) can not rotate the tool securing arms 110 and 120 to the tool release position and the thief is thus prevented from removing the attachment tool 60 from the skid steer loader 70.

The length of the extendable shaft 55 can be varied by an operator sliding the segments 140 and 150. The maximum length of the extendable shaft 55 should be sufficient to permit the opposite ends 90 and 100 to accommodate the opposite facing tool securing arms 110 and 120 as shown in FIG. 1; and short enough in the telescoped form to allow the attachment lock 50 to be fitted to the securing arms 110 and 120 as described above.

Figure 4A:
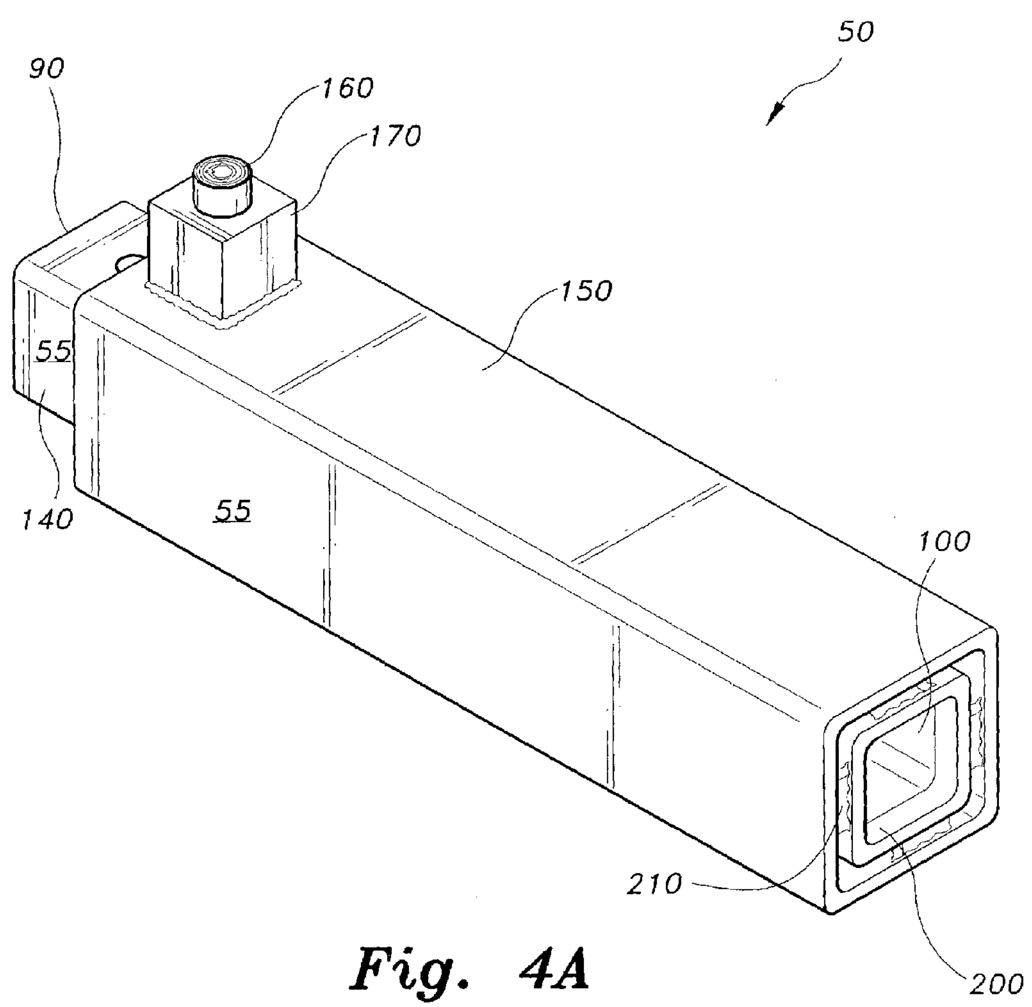
FIG. 4A is an elevated perspective view of the skid steer attachment lock according to the invention.
Figure 4B:
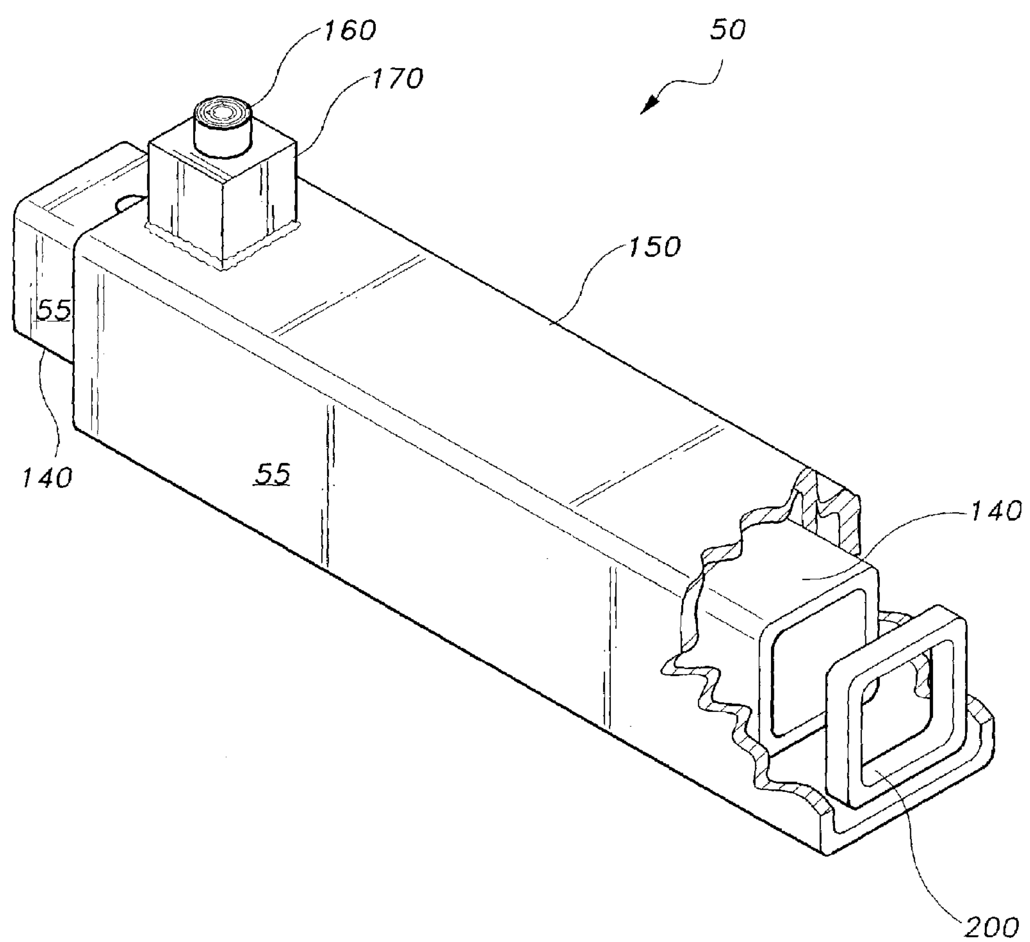
FIG. 4B is a partially cut away view of the skid steer attachment lock of FIG. 4A.

FIGS. 4A and 4B show an elevated view of the attachment lock 50. An optional restriction member 200 is shown inside end 100 of the outer segment 150. The optional restriction member 200 is sized to allow a securing arm (110 or 120) to slide into the end 100 of the outer segment 150 while preventing the inner segment 140 from traveling through the open end 100. This optional feature allows an operator to safely hold the attachment lock 50 in a vertical orientation with one hand without fear of the inner segment 140 falling through the outer segment 150. Additionally, this feature allows for an equally tight fit on locking arms 110 and 120. The optional member 200 is preferably made of a durable material and attached to the interior surface of the outer segment. For example, the member 200 may be made of steel, and attached by at least one weld 210 to the interior surface of the outer segment 150 as shown in FIG. 4A. The inner 140 and outer 150 shaft segments are preferably generally rectangular in shape, and more preferably have a square cross-section. However, the segments 140 and 150 may be of circular cross-section or any other suitable cross-section shape. In addition, the invention includes other permutations that might be found in U.S. Provisional Patent Application Ser. No. 60/363,275. U.S. Provisional Patent Application Ser. No. 60/363,275 is incorporated herein by reference in its entirety.

The lengths of the inner shaft segment 140 is preferably in the range between about 7 inches and 15 inches; and more preferably in the range between about 8 inches and 13.5 inches. The lengths of the outer shaft segment 150 is preferably in the range between about 7 inches and 15 inches; and more preferably in the range between about 8 inches and 13.5 inches. The internal height 141 of the inner shaft segment 140 can vary but should be sufficient to accommodate the width of either of the securing arms 110 and 120. The external height 142 of the inner shaft segment 140 should be less than the internal height 151 of the outer shaft segment 150. The internal height 151 of the outer segment 150 can vary but should be sufficient to accommodate the dimensions of either of the securing arms 110 and 120 and should be greater than the external height 142 of the inner segment 140. However, it will be understood that the inner 140 and outer 150 segments may be made with different dimensions to accommodate securing arms 110 and 120 of different lengths and different distances apart.

It is to be understood that the present invention is not limited to the embodiments described above, but encompasses any and all embodiments within the scope of the following claims.

I claim:

1. An attachment lock to inhibit the illicit removal of a skid steer attachment tool from a steer skid loader, said attachment lock consisting of:

an extendable hollow shaft having an outer shaft segment and an inner shaft segment, each shaft segment having a longitudinal axis;

the outer shaft segment having a first open end along the longitudinal axis of the outer shaft segment, the first open end being configured to accommodate a first attachment tool locking arm of a steer skid loader;

the inner shaft segment having a second open end along the longitudinal axis of the inner shaft segment, the second open end being opposite the first open end and being configured to accommodate a second attachment tool locking arm of a steer skid loader, the inner shaft segment being configured to telescope into the outer shaft segment;

restriction means for preventing the inner shaft segment from telescoping through the first end, the restriction means being a hollow metal element welded to and positioned within the outer shaft segment proximate the first open end; and a locking mechanism attached to the extendable hollow shaft for temporarily locking the extendable shaft at a desired length thereby providing the attachment lock, wherein the locking mechanism is surrounded and protected by a housing, whereby the attachment lock is configured to prevent the illicit removal of a skid steer attachment tool from a steer skid loader.

2. An attachment lock as in claim 1, wherein the restriction means has a generally rectangular cross-section, the outer shaft segment has a generally rectangular cross-section and is perforated to define an outer hole, and the inner shaft segment has a generally rectangular cross-section and is perforated along at least one side thereby defining a plurality of inner holes, and wherein the locking mechanism is capable of engaging with the outer hole and one of the plurality of inner holes to prevent movement of the inner shaft segment relative to the outer shaft segment.

3. An attachment lock as in claim 1, wherein the restriction means has a generally rectangular cross-section, the outer shaft segment has a square cross-section and is perforated to define an outer hole, and the inner shaft segment has a square cross-section and is perforated along at least one side thereby defining a plurality of inner holes, and wherein the locking mechanism is capable of engaging with the outer hole and one of the plurality of inner holes to prevent movement of the inner shaft segment relative to the outer shaft segment.

4. An attachment lock as in claim 1, wherein the outer shaft segment is configured to prevent the inner shaft segment from separating from the attachment lock when the attachment lock is held in a vertical orientation.

5. An attachment lock as in claim 1, wherein the inner and the outer shaft segments are square in cross section.

6. An attachment lock as in claim 1, wherein the outer and inner shaft segments and the restriction means are made of steel in order to provide durability and strength.

7. An attachment lock as in claim 1, in combination with the first attachment tool locking arm of a steer skid loader.

8. An attachment lock to inhibit illicit removal of a skid steer attachment tool from a steer skid loader, said attachment lock consisting of:

an extendable hollow shaft having an outer shaft segment and an inner shaft segment, each shaft segment having a longitudinal axis;

the outer shaft segment, the first open end being configured to accommodate a first attachment tool locking arm of a steer skid loader;

the inner shaft segment having a second open end along the longitudinal axis of the inner shaft segment, the second open end being opposite the first open end and being configured to accommodate a second attachment tool locking arm of a steer skid loader, the inner shaft segment being configured to telescope into the outer shaft segment;

restriction means for preventing the inner shaft segment from telescoping through the first end, the restriction means being a hollow metal element of square cross-section welded to and positioned within the outer shaft segment proximate the first open end; and a locking mechanism attached to the outer shaft segment, wherein the locking mechanism is surrounded and protected by a housing, wherein the outer shaft segment is of square cross-section and perforated to define an outer hole, and the inner shaft segment is of square cross-section and perforated along one side thereby defining a plurality of inner holes, and wherein the locking mechanism is capable of engaging with the outer hole and one of the plurality of inner holes to prevent movement of the inner shaft segment relative to the outer shaft segment thereby temporarily locking the extendable shaft at a desired length.

9. An attachment lock as in claim 8, wherein the outer and inner shaft segments and the restriction means are made of steel in order to provide durability and strength.

10. An attachment lock as in claim 8, in combination with the first attachment tool locking arm of a steer skid loader.

* * * * *